Patented Dec. 3, 1935

2,023,160

UNITED STATES PATENT OFFICE 2,023,160

ALKYL CHLORO-DIOXY-BENZOLS

William E. Austin, New York, N. Y.

No Drawing. Application March 14, 1934
Serial No. 715,495

7 Claims. (Cl. 260—154)

This invention relates to new alkyl derivatives of chloro-dioxybenzols, characterized by the fact that the alkyl attached to the benzol nucleus is a tertiary alkyl group.

These compounds may be represented by the general formula $C_6H_2Cl(OH)_2CR_1R_2R_3$ where $R_1$, $R_2$, $R_3$ are alkyl groups, either straight-chained or branched, and the OH groups being either in ortho, in meta, or in para position to each other.

Among the alkyl chloro-dioxy benzols within the scope of this invention are the tertiary butyl, the tertiary amyl, the tertiary hexyl, the tertiary heptyl, the tertiary octyl, and the tertiary nonyl derivatives of chloro-pyrocatechol, of chloro-resorcinol, and of chloro-hydroquinone, respectively.

The new alkyl chloro-dioxy benzols may be prepared by introducing the chlorine into the corresponding tertiary alkyl dioxy benzol, or by introducing the desired tertiary alkyl group into the chloro-dioxy benzol derivative.

The compounds of this invention possess especial germicidal and antiseptic activity coupled with relatively low toxicity, which properties may be utilized in the form of various antiseptics, germicidal and prophylactic solutions, jellies, lozenges and other media.

The following examples are illustrative of the preparation of the compounds of the present invention:

Example 1.—Tertiary butyl chloro-resorcinol $((CH_3)_3C—C_6H_2Cl(OH)_2)$ may be prepared by the following process: 55 gr. of resorcinol are dissolved in 100 cc. ether, and 74 gr. sulfuryl chloride added dropwise. The temperature of the mixture is gradually raised to 70° C. and maintained for 3 hours, during which time suction is applied to remove the HCl and $SO_2$ liberated in the reaction. The temperature is then raised to 100° C. and the ether evaporated, leaving chloro-resorcinol. To this are added 50 gr. tertiary butyl alcohol (tri-methyl carbinol), while stirring and then 10 cc. concentrated hydrochloric acid, and in small portions 30 gr. of anhydrous zinc chloride, the mixture being heated about 1 hour at 105° C. After cooling, the product is washed several times with water, dissolved in dilute caustic soda solution, reprecipitated with dilute hydrochloric acid, and the product then taken up with benzol, and again washed with water, after which the benzol solution is distilled, yielding a major fraction boiling at 135-140° C./5 mm. The product crystallizes on standing.

Example 2.—Tertiary amyl chloro-resorcinol $((CH_3)_2C_2H_5C—C_6H_2Cl(OH)_2)$ may be prepared by the following process: To chloro-resorcinol prepared as in Example 1 from 55 gr. resorcinol are added 50 gr. tertiary amyl alcohol (di-methyl ethyl carbinol) and 10 cc. concentrated hydrochloric acid and the mixture heated to 100° C. Then 30 gr. anhydrous zinc chloride are gradually added, and heating is continued for 2 hours. After cooling, the product is washed with water, dissolved in dilute caustic soda, reprecipitated with dilute hydrochloric acid, then taken up with benzol and again washed with water, after which the benzol solution is distilled. The major fraction is obtained at 145-150° C./7 mm. The product crystallizes on standing.

Example 3.—Tertiary amyl chloro-hydroquinone may be prepared by the following procedure: 28 gr. chloro-hydroquinone, 25 gr. tertiary amyl alcohol (dimethyl ethyl carbinol) and 12 gr. anhydrous zinc chloride are heated together with stirring to about 95° C. and when all is in solution 5 cc. concentrated hydrochloric acid are added dropwise, and heating is continued for 2½ hours. After cooling, the oily layer is washed several times with water, taken up with benzol, washed again, and distilled at 148-150° C./4 mm. The product crystallizes on standing.

Example 4.—Mono-tertiary octyl chloro-resorcinol (diisobutyl chloro-resorcinol)

$$((CH_3)_3C—CH_2—(CH_3)_2C—C_6H_2Cl(OH)_2)$$

may be prepared by the following procedure: Chloro-resorcinol prepared as in Example 1 from 27.5 gr. of resorcinol, is dissolved in 250 cc. glacial acetic acid. To this solution after cooling below 15° C. 25 cc. concentrated sulfuric acid are added dropwise. Then 28 gr. diisobutylene are run in slowly. The mixture is then heated at 50° C. for 4 hours, and poured into 4 liters of water. The oil which separates is taken up with ether, washed and distilled, yielding an oil which solidifies. On recrystallizing, a white granular product melting at 103-104° C. is obtained.

Example 5.—Tertiary amyl chloro-catechol may be prepared by the following procedure: 27.5 gr. catechol are dissolved in 75 cc. ether, and 37 gr. sulfuryl chloride added slowly. After heating 3 hours at 70° C. the solvent is evaporated, and to the residue 27 gr. tertiary amyl alcohol (dimethyl ethyl carbinol) are added, then 15 gr. anhydrous zinc chloride, and after the mixture has dissolved, 5 cc. concentrated hydrochloric acid are added dropwise, the temperature is raised to 125° C. and heating is continued for 2½ hours. After cooling, the oily product is washed several times with water, then taken up with benzol, the benzol extract washed, and then distilled, yielding a major fraction boiling at 135–140° C./3 mm.

*Example 6.*—Mono-tertiary octyl chloro-catechol (diisobutyl chloro-catechol) may be prepared as follows: Chloro-catechol prepared as in 5 from 27.5 gr. catechol is dissolved in 250 cc. glacial acetic acid, the solution cooled to 15° C., then 25 cc. concentrated sulfuric acid added dropwise, followed by 28 gr. diisobutylene. After warming the mixture at 40° C. for 3 hours, it is poured into 1.5 liters water. The oily layer which separates is taken up with benzol, washed with water and distilled at 150–165° C./5 mm., the product solidifying on standing.

These compounds may be prepared also by chlorinating the corresponding tertiary alkyl dioxy-benzol, as for example, tertiary octyl chloro-resorcinol can be obtained by starting with mono-tertiary octyl resorcinol (diisobutyl resorcinol prepared as per Niederl, journal American Chemical Society, June, 1933), dissolving it in ether, then adding sulfuryl chloride, heating about 3 hours at 70° C., evaporating the solvent, washing the residue, and recrystallizing from carbon tetrachloride, thus obtaining a product as in Example 4.

The invention is not limited by the descriptions or examples cited, which are merely illustrative.

I claim:

1. Alkyl derivatives of chloro-dioxy benzols having the general formula $C_6H_2Cl(OH)_2CR_1R_2R_3$ where $R_1$, $R_2$, $R_3$ are alkyls, either straight-chained or branched.

2. Alkyl derivatives of chloro-dioxy benzols having the general formula $C_6H_2Cl(OH)_2CR_1R_2R_3$ where $R_1$, $R_2$, $R_3$, are alkyls, either straight-chained or branched, and the OH groups being either in ortho, in meta, or in para position to each other.

3. Mono-tertiary alkyl chloro-resorcinols.

4. Mono-tertiary octyl chloro-resorcinols.

5. Mono-tertiary octyl chloro-resorcinol having the formula $$(CH_3)_3C-CH_2-(CH_3)_2C-C_6H_2Cl(OH)_2.$$

6. Tertiary amyl chloro-resorcinol having the formula $(CH_3)_2C_2H_5C-C_6H_2Cl(OH)_2$.

7. Tertiary butyl chloro-resorcinol.

WILLIAM E. AUSTIN.